United States Patent
Che et al.

(10) Patent No.: US 9,430,304 B2
(45) Date of Patent: Aug. 30, 2016

(54) METHOD AND SYSTEM FOR BLOCK SCHEDULING CONTROL IN A PROCESSOR BY REMAPPING

(71) Applicant: Advanced Micro Devices, Inc., Sunnyvale, CA (US)

(72) Inventors: Shuai Che, Bellevue, WA (US); Derek R. Hower, Seattle, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 7 days.

(21) Appl. No.: 14/523,682

(22) Filed: Oct. 24, 2014

(65) Prior Publication Data

US 2016/0117206 A1    Apr. 28, 2016

(51) Int. Cl.
| | |
|---|---|
| G06F 9/46 | (2006.01) |
| G06F 12/00 | (2006.01) |
| G06F 13/00 | (2006.01) |
| G06F 13/28 | (2006.01) |
| G06F 9/54 | (2006.01) |
| G06T 1/20 | (2006.01) |

(52) U.S. Cl.
CPC ............... *G06F 9/547* (2013.01); *G06T 1/20* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 2002/0129173 A1* | 9/2002 | Weber | ..................... | G06F 13/14 719/310 |
| 2004/0193739 A1* | 9/2004 | Shimizu | .................. | G06F 21/78 710/1 |
| 2006/0181732 A1* | 8/2006 | Yabuki | ................... | H04N 1/327 358/1.15 |
| 2011/0126200 A1* | 5/2011 | Krieger | ................. | G06F 9/5033 718/102 |
| 2012/0096244 A1* | 4/2012 | Zhang | ..................... | G06F 17/18 712/222 |
| 2013/0080073 A1* | 3/2013 | de Corral | ............... | G01N 30/86 702/23 |
| 2014/0089642 A1* | 3/2014 | Gottschlich | ............. | G06F 11/30 712/220 |
| 2014/0123150 A1* | 5/2014 | Lindholm | ............. | G06F 9/3851 718/103 |
| 2014/0156717 A1* | 6/2014 | Krishna | ............ | G06F 17/30082 707/830 |
| 2016/0034205 A1* | 2/2016 | Mehra | ................... | G06F 3/0613 711/153 |

OTHER PUBLICATIONS

Advanced Micro Devices, "Introduction to OpenCL™ Programming," Training Guide Publication # 137-41768-10, Rev: A, Issue Date: May 2010 (108 pages).

* cited by examiner

*Primary Examiner* — Adam Lee
(74) *Attorney, Agent, or Firm* — Volpe and Koenig, P.C.

(57) ABSTRACT

A method and a system for block scheduling are disclosed. The method includes retrieving an original block ID, determining a corresponding new block ID from a mapping, executing a new block corresponding to the new block ID, and repeating the retrieving, determining, and executing for each original block ID. The system includes a program memory configured to store multi-block computer programs, an identifier memory configured to store block identifiers (ID's), management hardware configured to retrieve an original block ID from the program memory, scheduling hardware configured to receive the original block ID from the management hardware and determine a new block ID corresponding to the original block ID using a stored mapping, and processing hardware configured to receive the new block ID from the scheduling hardware and execute a new block corresponding to the new block ID.

16 Claims, 4 Drawing Sheets

| OLD WORK GROUP IDS | NEW WORK GROUP IDS |
|---|---|
| 1 | 2 |
| 2 | 4 |
| 3 | 1 |
| 4 | 5 |
| 5 | 3 |

METHOD AND SYSTEM FOR BLOCK SCHEDULING CONTROL IN A PROCESSOR BY REMAPPING

TECHNICAL FIELD

The disclosed embodiments are generally directed to electronic processors.

BACKGROUND

Parallel processors, such as graphics processing units (GPUs), are powerful devices that may be used for performing complex general purpose computations. Programming languages and application programming interfaces (API's) such as Open Computing Language (OpenCL) and Compute Unified Device Architecture (CUDA) have been developed for efficient programming of these devices.

A kernel is a program containing multiple threads that executes on a computing device. A kernel contains blocks of threads that operate on many inputs in parallel. Examples of such blocks are workgroups in OpenCL and thread blocks in CUDA. When programmers write a program using an API such as OpenCL or CUDA, they must assume that each block in a kernel is independent. A programmer can make no assumptions about the order in which blocks are executed in hardware. In addition, because hardware scheduling policies may vary across vendors, code written for one platform may not perform well on another.

SUMMARY OF EMBODIMENTS

A method and a system for block scheduling are disclosed. The method includes retrieving an original block identifier (ID), determining a corresponding new block ID from a mapping, executing a new block corresponding to the new block ID, and repeating the retrieving, determining, and executing for each original block ID. The system includes a program memory configured to store multi-block computer programs, management hardware configured to retrieve an original block ID from the program memory, scheduling hardware configured to receive the original block ID from the management hardware and determine a new block ID corresponding to the original block ID using a stored mapping, and processing hardware configured to receive the new block ID from the scheduling hardware and execute a new block corresponding to the new block ID.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

The order in which blocks are scheduled on particular hardware can impact performance, especially if blocks within a kernel exhibit some data locality. For example, performance of computations could be enhanced if blocks that access the same portion of a memory are scheduled around the same time. This locality, however, is highly workload dependent and can be difficult for scheduling hardware to determine.

Flexible control of work group scheduling order may result in enhanced overall computation performance of a processor without a need to modify an actual computation kernel. Furthermore, with introduction of new structures described herein, processor hardware does not need to implement a large number of application-specific scheduling policies.

Figure 1:
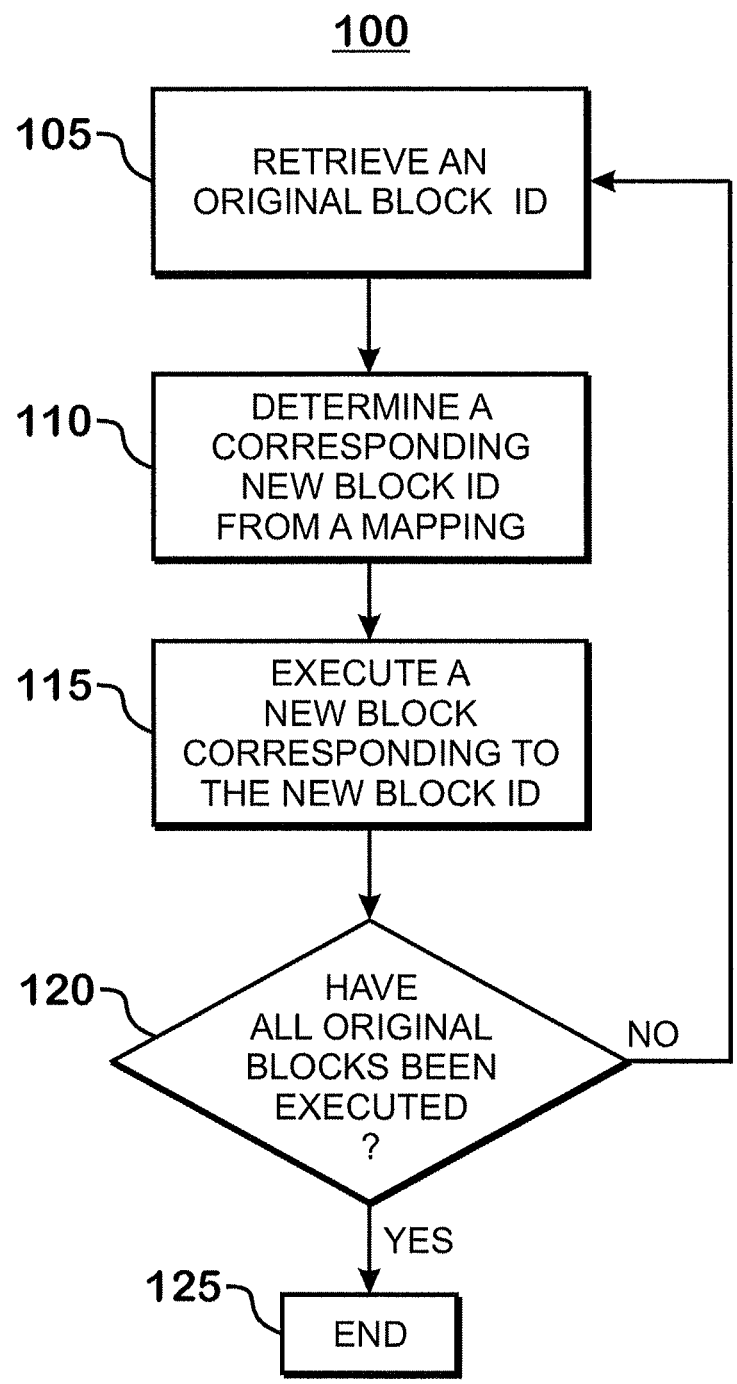
FIG. 1 is an example of a method for block scheduling.

FIG. 1 shows an example of a method 100 for block scheduling of computation tasks in a processor. Blocks are identified by stored identifiers (ID's). An original block ID may be retrieved from a block ID memory or program memory 105. A corresponding new block ID may be determined using a mapping between block ID's 110. This mapping process will be described in greater detail hereinafter. The mapping may be stored in a memory or other mapping hardware. A new block corresponding to the new block ID may be executed 115. A check may be made whether or not all blocks needed for a computation have been executed 120. If more blocks must be executed, method 100 may return to the retrieving step 105 and retrieve another original block ID to begin a repetition. The method 100 may continue in this manner until all blocks needed for a computation have been executed, in which case the method 100 ends 125.

In the execution of the method 100, the original block ID's may be retrieved in a predetermined order that is not changeable. The mapping of each original block ID to a new block ID improves certain aspects of program execution, such as scheduling blocks that access the same portion of a memory around the same time. The improvement is brought about by changing the order in which the blocks are executed, based on the mapping. The mapping may be created by analyzing the program to be executed based on platform-specific information.

More generally, several different mappings of the same block ID's to different sets of new ID's may be executed in parallel to improve overall program execution. This generalization may be illustrated by imagining multiple copies of the method shown in FIG. 1 running in parallel, where the mapping used in step 110 is different in each copy.

The mapping may be pre-defined and may remain fixed during execution of a kernel. A pre-defined mapping may be created, at least initially, by programming by a human programmer using an application program interface (API). The programmer may pre-define the mapping by analyzing the program to be executed, based on platform-specific information. The mapping may be reconfigured automatically during execution of a kernel, in response to a change in an environment in which the kernel is running. An example of such a change is changing an allocation of memory. More generally, if more than one kernel executes, each of those kernels may use a different mapping, and each of those mappings may be reconfigured independently of the others in response to environmental changes for its particular kernel.

Figures 2, 3:
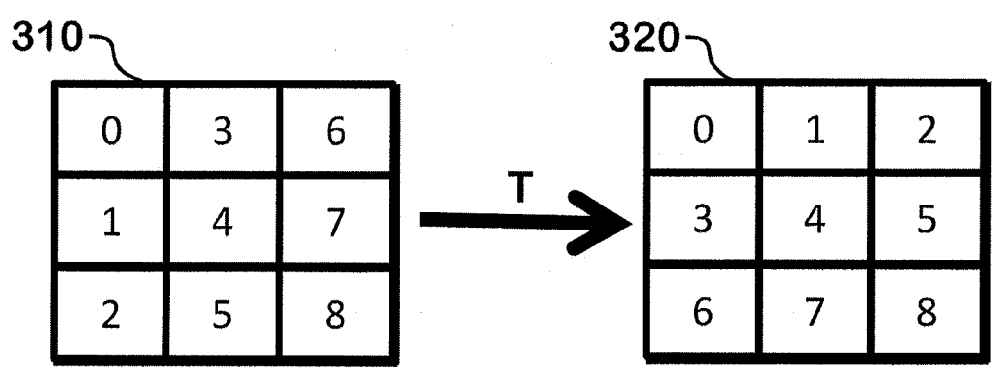
FIG. 2 is an example of a lookup table for block ID's.
FIG. 3 is an example of a function mapping.

The mapping may be created by constructing a lookup table specifying a new block ID corresponding to each original block ID. The lookup table may be stored in a hardware buffer. FIG. 2 shows an example of such a lookup table. In this example, original block ID 1 is mapped to new block ID 2, original block ID 2 is mapped to new block ID 4, and so on.

Alternatively, the mapping may be created by executing a function, such as a mathematical function or operation, with an original block ID as an input to the function and the mapped new block ID as the output to the function. A non-limiting example of such a function mapping is shown in FIG. 3. Original block ID's are contained in a two-dimensional original array, or matrix 310. A mapping is obtained by performing a transpose function or operation T on original array 310, to obtain mapped array 320. The first row of mapped array 320 is the first column of original array 310, the second row of mapped array 320 is the second column of original array 310 and so forth. The resulting mapping is given by pairs of corresponding elements in the two arrays, so that original block ID 0 is mapped to itself, original block ID 3 is mapped to new block ID 1, original block ID 7 is mapped to new block ID 5, and so on.

In a method such as that shown in FIG. 1, each original block and each mapped block may include a workgroup, identified with a workgroup ID, executing a portion of a kernel in a processor. As an example, each of a plurality of workgroups may be dispatched to a single instruction-multiple data (SIMD) engine for execution on a graphics processing unit (GPU) as the processor. Execution of a block may include, for example, processing of a block of pixels, such as a macroblock, in an image, such as a still image or a frame of a video image. Execution of a block is not limited to this example, however.

Methods described herein are not limited to GPU models such as CUDA and OpenCL. For example, they are applicable to any blocking model which includes concepts similar to block ids and thread ids. Methods described herein may be also extended, in a more fine-grained way, to scheduling inside a block, such as wavefront remapping.

Figure 4:
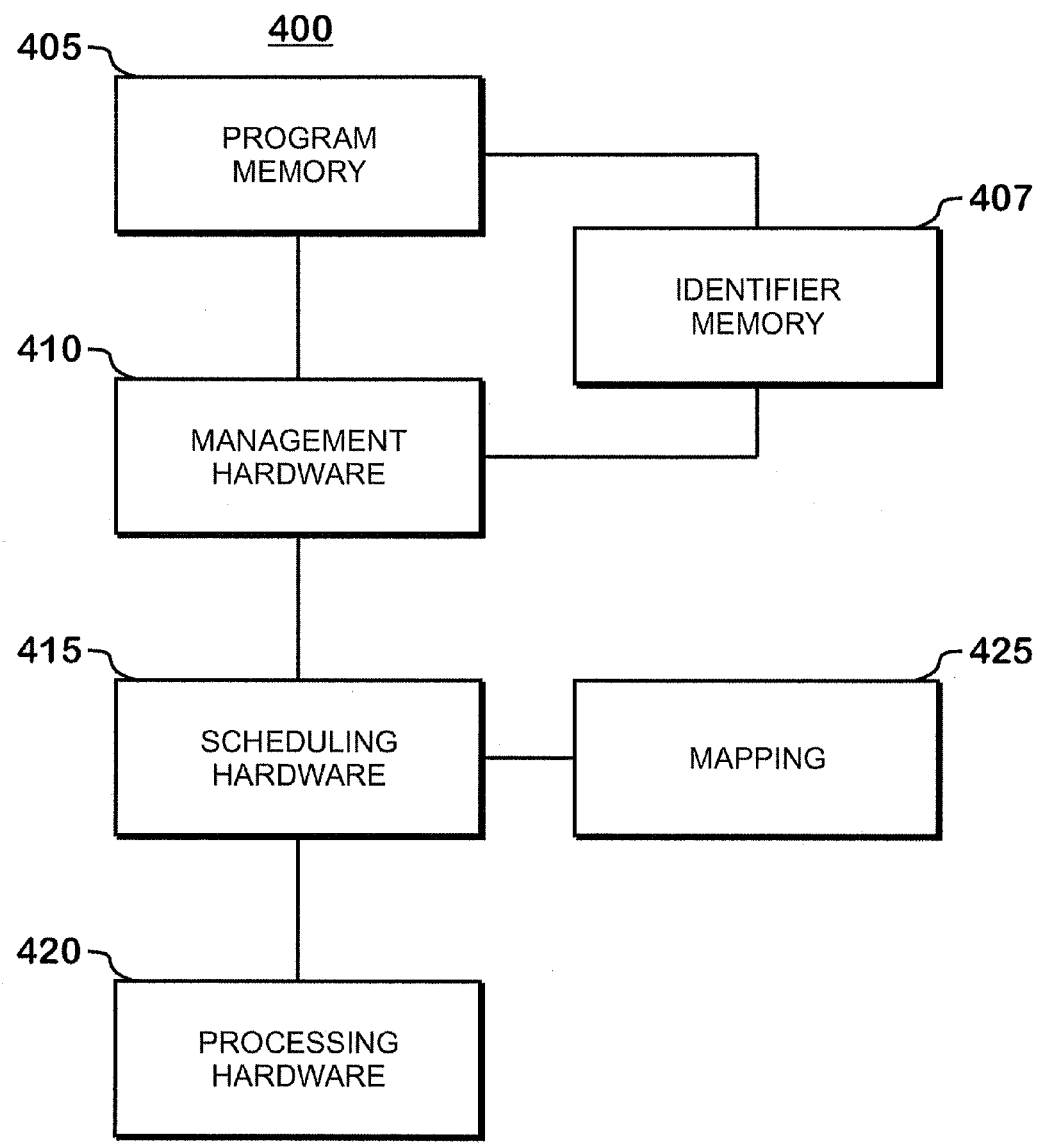
FIG. 4 is an example of a system for block scheduling.

FIG. 4 shows an example of a system 400 for executing a method of block scheduling. The system includes a program memory 405 configured to store multi-block computer programs, identifier memory 407 configured to store block identifiers (ID's), management hardware 410 configured to retrieve an original block ID from identifier memory 407, scheduling hardware 415 configured to receive the original block ID from the management hardware 410 and determine a new block ID corresponding to the original block ID using a stored mapping 425, and processing hardware 420 configured to receive the new block ID from scheduling hardware 415 and execute a new block corresponding to the new block ID. Identifier memory 407 may be an added dedicated memory or may leverage already existing memory or registers, such as program memory 405.

Management hardware 410 may be configured to retrieve original block ID's from identifier memory 407 in a predetermined order. Stored mapping 425 may be based on analysis of a program to be executed, the analysis based on platform-specific information. Stored mapping 425 may be created using an application program interface (API). Stored mapping 425 may be pre-defined and remain the same during execution of a kernel. Alternatively, scheduling hardware 415 may be configured to reconfigure stored mapping 425 during execution of a kernel in response to a changing environment in which the kernel is running.

Stored mapping 425 may be configured as a lookup table and scheduling hardware 415 may be configured to determine a new block ID corresponding to each original block ID using the lookup table. Alternatively, stored mapping 425 may be generated by the execution of a function, with an original block ID being an input to the function. The function may be predetermined and may be executed by scheduling hardware 415 to generate mapping 425.

Processing hardware 420 may include a graphics processing unit (GPU), a central processing unit (CPU) or both. The blocks, including the new block determined by mapping 425, may be, but are not limited to, work items or workgroups, as defined in Open Computing Language (OpenCL), or threads, thread groups, or thread blocks, as defined in Compute Unified Device Architecture (CUDA) or other similar objects, designed to execute a kernel stored in program memory 405 and executed in processing hardware 420.

Figure 5:
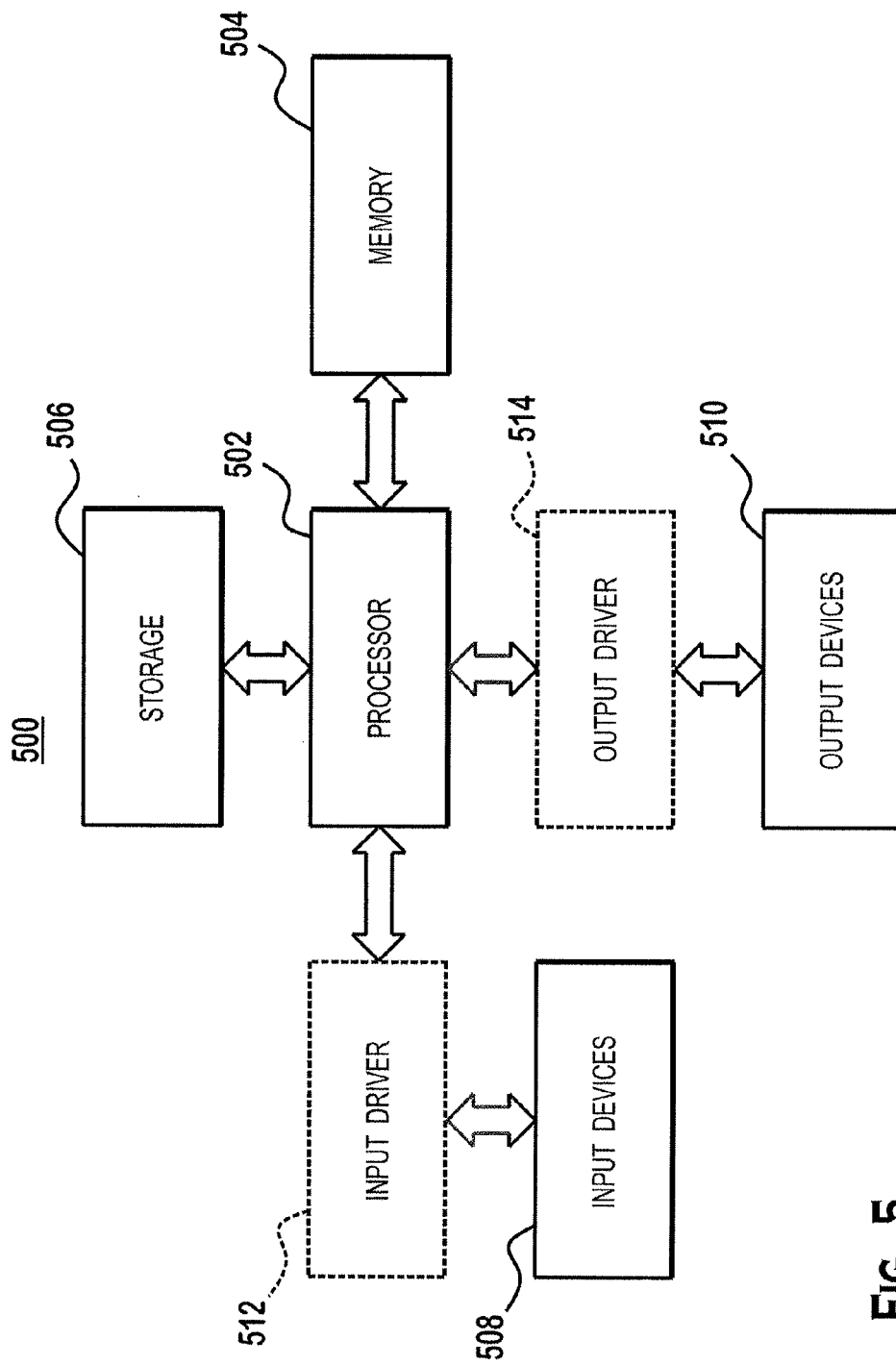
FIG. 5 is a block diagram of an example device in which one or more disclosed embodiments may be implemented.

FIG. 5 is a block diagram of an example device 500 in which one or more disclosed embodiments may be implemented. The device 500 may include, for example, a computer, a gaming device, a handheld device, a set-top box, a television, a mobile phone, or a tablet computer. The device 500 includes a processor 502, a memory 504, a storage 506, one or more input devices 508, and one or more output devices 510. The device 500 may also optionally include an input driver 512 and an output driver 514. It is understood that the device 500 may include additional components not shown in FIG. 5.

Processor 502 may be configured to implement a method for block scheduling with remapping of block ID's, as described hereinbefore. Storage 506 or memory 504 or both may be configured to store, for example, any of programs to be executed, software for analyzing programs to be executed, original block ID's, or block ID mappings, as described hereinbefore.

The processor 502 may include a central processing unit (CPU), a graphics processing unit (GPU), a CPU and GPU located on the same die, or one or more processor cores, wherein each processor core may be a CPU or a GPU. The memory 504 may be located on the same die as the processor 502, or may be located separately from the processor 502. The memory 504 may include a volatile or non-volatile memory, for example, random access memory (RAM), dynamic RAM, or a cache.

The storage 506 may include a fixed or removable storage, for example, a hard disk drive, a solid state drive, an optical disk, or a flash drive. The input devices 508 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 may include a display, a speaker, a printer, a haptic feedback device, one or more lights, an antenna, or a network connection (e.g., a wireless local area network card for transmission and/or reception of wireless IEEE 802 signals).

The input driver 512 communicates with the processor 502 and the input devices 508, and permits the processor 502 to receive input from the input devices 508. The output driver 514 communicates with the processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for block scheduling, the method comprising:
    retrieving an original block identifier (ID) from a plurality of block IDs, wherein each of the plurality of block IDs identifies a block of memory;
    performing a mathematical operation on the original block ID to create a mapping, wherein the mapping represents an execution order for the plurality of block IDs:
    determining, from the mapping, a new block ID corresponding to the original block ID;
    scheduling execution of a new block identified by the new block ID;
    executing the new block; and
    repeating the retrieving, performing, determining, scheduling, and executing for each of the plurality of block IDs.

2. The method of claim 1, wherein each of the plurality of block IDs is retrieved in a predetermined order.

3. The method of claim 1, wherein the mapping is further created by analyzing a program to be executed based on platform-specific information.

4. The method of claim 1, wherein the mapping is further created by programming using an application program interface (API).

5. The method of claim 1, wherein the mapping is reconfigured during execution of a kernel.

6. The method of claim 1, wherein the original block and the new block each comprises an object executing a kernel in processing hardware, the object comprising a work item, a workgroup, a thread block, or a thread group.

7. The method of claim 6, wherein the processing hardware comprises at least one of: a graphics processing unit, or a central processing unit.

8. The method of claim 1, further comprising:
    creating a two-dimensional array of the plurality of block IDs;
    wherein the mathematical operation includes a transpose function performed on the two-dimensional array.

9. An apparatus for block scheduling in a processor comprising:
    a program memory configured to store multi-block computer programs;
    an identifier memory configured to store block identifiers (IDs), wherein each of the of block IDs identifies a block of program memory;
    management hardware configured to retrieve one or more original block IDs from the identifier memory;
    scheduling hardware configured to:
        receive the one or more original block IDs from the management hardware,
        perform a mathematical operation on the one or more original block IDs to create a mapping, wherein the mapping represents an execution order of the block IDs,
        determine, from the mapping, one or more new block IDs corresponding to the one or more original block IDs, and
        schedule execution of one or more new blocks identified by the one or more new block IDs; and
    processing hardware configured to:
        receive the one or more new block IDs from the scheduling hardware, and
        execute the one or more new blocks identified by the one or more new block IDs.

10. The apparatus of claim 9, wherein the management hardware is configured to retrieve original block IDs from the program memory in a predetermined order.

11. The apparatus of claim 9, wherein the mapping is further based on analysis of a program to be executed and the analysis is based on platform-specific information.

12. The apparatus of claim 9, wherein the mapping is further created using an application program interface (API).

13. The apparatus of claim 9, wherein the scheduling hardware is configured to reconfigure the mapping during execution of a kernel.

14. The apparatus of claim 9, wherein the processing hardware is configured to execute the new block as an object executing a kernel, the object comprising a work item, a workgroup, a thread block, or a thread group.

15. The apparatus of claim 9, wherein the processing hardware comprises at least one of: a graphics processing unit, or a central processing unit.

16. The apparatus of claim 9, wherein:
    the scheduling hardware is further configured to create a two-dimensional array of the one or more original block IDs;
    the mathematical operation includes a transpose function performed on the two-dimensional array.

* * * * *